US009077728B1

(12) United States Patent
Hart et al.

(10) Patent No.: US 9,077,728 B1
(45) Date of Patent: Jul. 7, 2015

(54) SYSTEMS AND METHODS FOR MANAGING ACCESS-CONTROL GROUPS

(75) Inventors: Michael Hart, Mountain View, CA (US); Yin Liu, Sunnyvale, CA (US)

(73) Assignee: Symantec Corporation, Mountain View, CA (US)

(*) Notice: Subject to any disclaimer, the term of this patent is extended or adjusted under 35 U.S.C. 154(b) by 240 days.

(21) Appl. No.: 13/420,840

(22) Filed: Mar. 15, 2012

(51) Int. Cl.
*H04L 29/06* (2006.01)
*G06F 21/62* (2013.01)

(52) U.S. Cl.
CPC .......... *H04L 63/104* (2013.01); *G06F 21/6218* (2013.01)

(58) Field of Classification Search
CPC ....... H04L 67/30; H04L 67/306; H04L 63/10; H04L 63/101; H04L 63/104; G06F 21/00; G06F 21/60; G06F 21/62; G06F 21/6218; G06F 21/6227
USPC .......................................................... 726/28
See application file for complete search history.

(56) References Cited

U.S. PATENT DOCUMENTS

| | | | |
|---|---|---|---|
| 8,025,541 B2* | 9/2011 | Churchill et al. ............... 441/40 |
| 2002/0057284 A1* | 5/2002 | Dalby et al. ................... 345/700 |
| 2008/0086473 A1* | 4/2008 | Searl et al. ......................... 707/9 |
| 2010/0088738 A1* | 4/2010 | Birnbach ........................... 726/1 |
| 2011/0010758 A1* | 1/2011 | Faitelson et al. .................. 726/4 |
| 2011/0047590 A1* | 2/2011 | Carr et al. ......................... 726/1 |

OTHER PUBLICATIONS

Ian Molloy et al.; Evaluating Role Mining Algorithms; Department of Computer Science, Purdue University; Proceedings of the 14th ACM symposium on Access control models and technologies; 2009.
Mohammad Jafari et al.; Role Mining in Access History Logs; International Journal of Computer Information Systems and Industrial Management Applications; pp. 258-265; 2009.
Varonis; White Paper: The Business Case for Data Governance; PreVentia.
Edward Wasilchin; Vaaronis; Managing Access Permissions to Unstructured Data; 2008.
Aaron Clauset et al.; Finding Community Structure in Very Large Networks; American Physical Society; 2004.

* cited by examiner

*Primary Examiner* — Yogesh Paliwal
(74) *Attorney, Agent, or Firm* — ALG Intellectual Property, LLC

(57) ABSTRACT

A computer-implemented method for managing access-control groups. The method may include (1) tracking users' access patterns to one or more shared resources, (2) analyzing the users' access patterns to identify a cluster of users who exhibit similar access patterns to the one or more shared resources, (3) identifying a preexisting access-control group to which one or more of the users is assigned, (4) comparing the preexisting access-control group to the cluster of users, and (5) organizing, based on the comparison, one or more of the users into one or more access-control groups. Various other methods, systems, and computer-readable media are also disclosed.

20 Claims, 6 Drawing Sheets

SYSTEMS AND METHODS FOR MANAGING ACCESS-CONTROL GROUPS

BACKGROUND

IT administrators are often confronted with how best to allow users to access corporate resources. Ideally, an administrator would grant each user within a corporation permission access to only those resources that are needed by the user to perform the user's job function. However, because of the number of permissions that may need to be managed, typical access-control systems make use of access-control groups (and/or roles) to which users are assigned and to which permissions to access resources are granted. In this way, an administrator may manage access to resources by managing the groups to which users belong and the resources to which groups have access.

Unfortunately, the use of access-control groups as a way to manage access to resources may introduce new, often conflicting, challenges for IT administrators. For example, an administrator may be required to maintain access-control groups that ensure that (1) every user that requires access to a resource has permission to access the resource and (2) every user that does not require access to a resource does not have access to the resource. However, because users' job functions change over time, in order to ensure that access-control groups do not become stale, an administrator may be required to continually update access-control group memberships and/or access-control group permissions, which may be a daunting task. Accordingly, the instant disclosure addresses a need for additional and improved systems and methods for managing access-control groups.

SUMMARY

As will be described in greater detail below, the instant disclosure generally relates to systems and methods for organizing users into access-control groups based on shared-resource access patterns and preexisting access-control group organizational efforts. In one example, a computer-implemented method for performing such a task may include (1) tracking users' access patterns to one or more shared resources, (2) analyzing the users' access patterns to identify a cluster of users who exhibit similar access patterns to the one or more shared resources, (3) identifying a preexisting access-control group to which one or more of the users is assigned, (4) comparing the preexisting access-control group to the cluster of users, and (5) organizing, based on the comparison, one or more of the users into one or more access-control groups.

In some embodiments, the step of identifying the preexisting access-control group to which one or more of the users is assigned may include identifying a plurality of preexisting access-control groups. In this embodiment, each preexisting access-control group within the plurality of preexisting access-control groups may be associated with at least one user from the cluster of users, and the step of comparing the preexisting access-control group to the cluster of users may include comparing the plurality of preexisting access-control groups to the cluster of users.

In certain embodiments, the step of comparing the plurality of preexisting access-control groups to the cluster of users may include identifying a subset of the plurality of preexisting access-control groups that reflects the cluster of users and one or more of the plurality of preexisting access-control groups.

In at least one embodiment, the step of comparing the plurality of preexisting access-control groups to the cluster of users may include calculating a score for the subset of the plurality of preexisting access-control groups using a linear combination of a number of groups within the subset of the plurality of preexisting access-control groups, a number of users within the subset of the plurality of preexisting access-control groups, and/or a percentage of users within the subset of the plurality of preexisting access-control groups whose access patterns have been tracked. The step of comparing the plurality of preexisting access-control groups to the cluster of users may further include determining whether the subset of the plurality of preexisting access-control groups can be used to represent the cluster of users by determining whether the score for the subset of the plurality of preexisting access-control groups is less than a predetermined threshold. Furthermore, the step of organizing one or more of the users into one or more access-control groups may include creating, based on the subset of preexisting access control groups and the cluster of users, a new access control group and organizing at least one user from the cluster of users into the new access-control group based on the determination that the score for the subset of the plurality of preexisting access-control groups is greater than the predetermined threshold.

In other embodiments, the step of organizing one or more of the users into one or more access-control groups may include organizing one or more of the users into one or more preexisting access-control groups and/or adjusting access-control permissions associated with the one or more preexisting access-control groups.

In some embodiments, the step of identifying the preexisting access-control group to which one or more of the users is assigned may include identifying the preexisting access-control group within a directory service. For example, in at least one embodiment, the directory service may include an active director service and/or a Lightweight Directory Access Protocol directory service.

In various embodiments, the step of analyzing the users' access patterns to identify the cluster of users who exhibit similar access patterns to the one or more shared resources may include (1) representing the users and the users' access patterns as a social network and (2) analyzing the social network to identify the cluster of users. For example, in one embodiment, the social network may include nodes that represent users and edges that represent an association between users who accessed a same file, an association between users who accessed a same folder, and/or an association between users who accessed the one or more shared resources from a same Internet Protocol address.

In one embodiment, a system for implementing the above-described method may include a tracking module programmed to track users' access patterns to one or more shared resources. The system may also include an analyzing module programmed to analyze the users' access patterns to identify a cluster of users who exhibit similar access patterns to the one or more shared resources. The system may also include an identification module programmed to identify a preexisting access-control group to which one or more of the users is assigned. The system may also include a comparison module programmed to compare the preexisting access-control group to the cluster of users. The system may further include an organization module programmed to organize one or more of the users into one or more access-control groups based on the comparison. Additionally, the system may include at least one processor configured to execute the tracking module, the analyzing module, the identification module, the comparison module, and the organization module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) track users' access patterns to one or more shared resources, (2) analyze the users' access patterns to identify a cluster of users who exhibit similar access patterns to the one or more shared resources, (3) identify a preexisting access-control group to which one or more of the users is assigned, (4) compare the preexisting access-control group to the cluster of users, and (5) organize, based on the comparison, one or more of the users into one or more access-control groups.

As will be explained in greater detail below, by organizing users into access-control groups based on shared-resource access patterns and preexisting access-control group organizational efforts, the systems and methods described herein may enable an administrator to manage access-control groups in an understandable and meaningful way. Furthermore, in some examples, by analyzing shared-resource access patterns and preexisting access-control group organizational efforts, these systems and methods may assist the administrator in identifying new access-control groups or combinations of preexisting access-control groups that reflect new roles or functions not yet represented by preexisting access-control groups.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
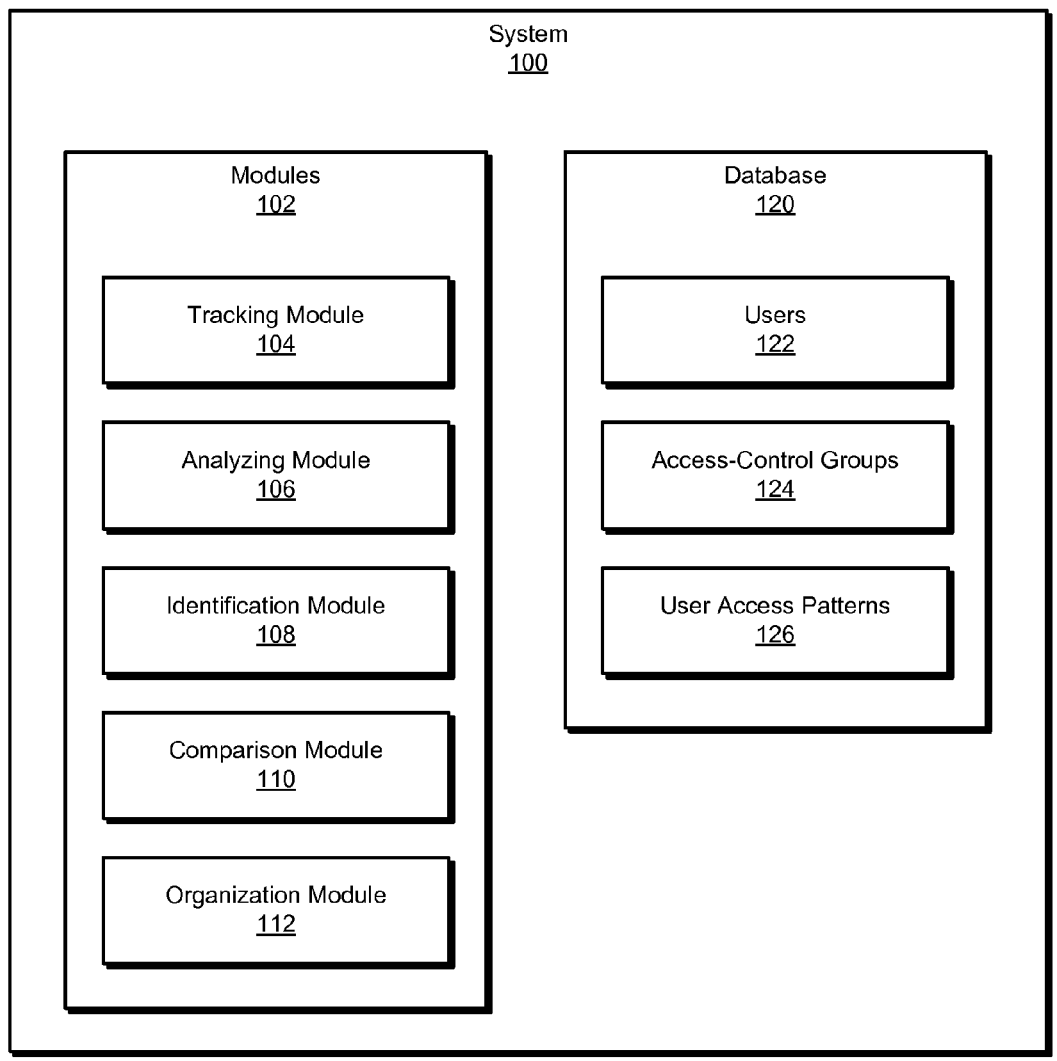
FIG. 1 is a block diagram of an exemplary system for managing access-control groups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
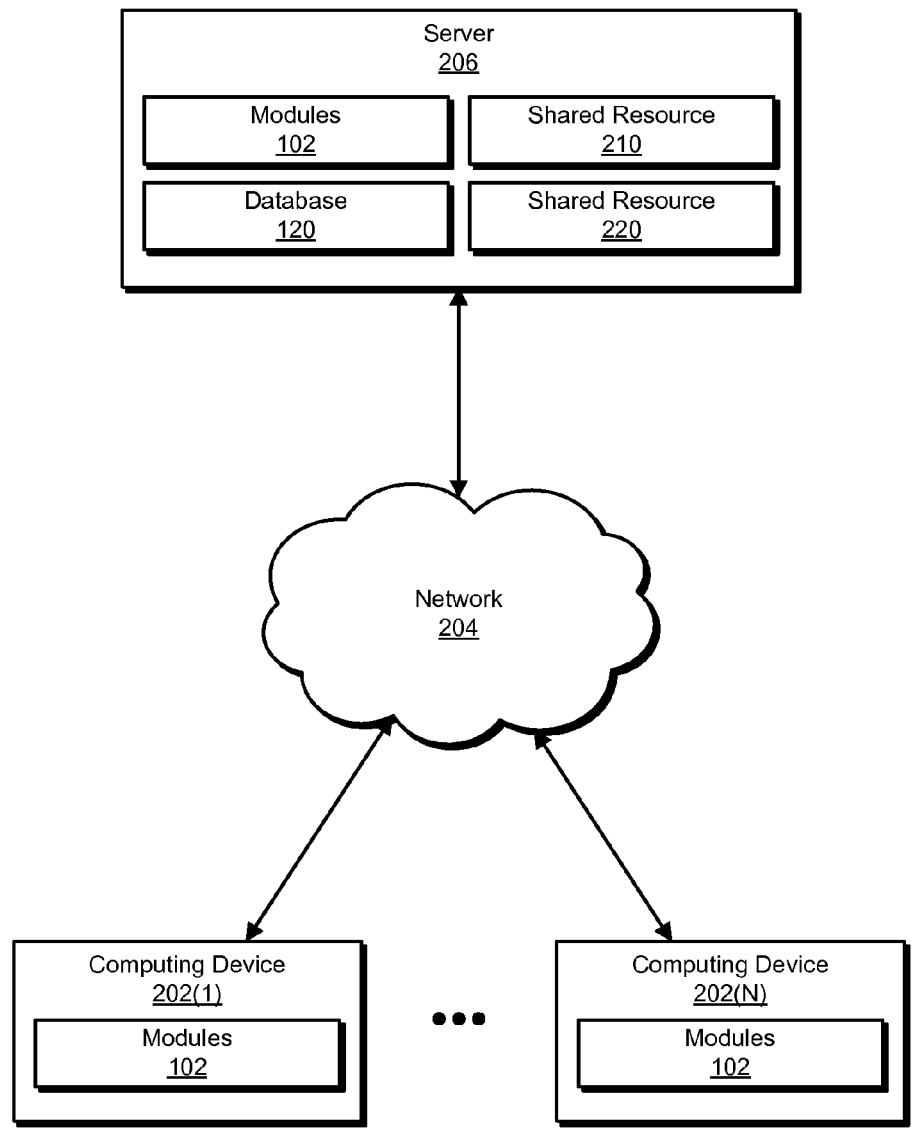
FIG. 2 is a block diagram of an exemplary system for managing access-control groups.

The following will provide, with reference to FIGS. 1-2, detailed descriptions of exemplary systems for managing access-control groups. Detailed descriptions of corresponding computer-implemented methods will also be provided in connection with FIG. 3. In addition, detailed descriptions of exemplary access-control groups and an exemplary cluster of users will be provided in connection with FIG. 4. Furthermore, detailed descriptions of an exemplary computing system and network architecture capable of implementing one or more of the embodiments described herein will be provided in connection with FIGS. 5 and 6, respectively.

FIG. 1 is a block diagram of an exemplary system 100 for managing access-control groups. As illustrated in this figure, exemplary system 100 may include one or more modules 102 for performing one or more tasks. For example, and as will be explained in greater detail below, exemplary system 100 may include a tracking module 104 programmed to track users' access patterns to one or more shared resources. Exemplary system 100 may also include an analyzing module 106 programmed to analyze the users' access patterns to identify a cluster of users who exhibit similar access patterns to the one or more shared resources.

In addition, and as will be described in greater detail below, exemplary system 100 may include an identification module 108 programmed to identify a preexisting access-control group to which one or more of the users is assigned. Exemplary system 100 may also include a comparison module 110 programmed to compare the preexisting access-control group to the cluster of users. Furthermore, system 100 may include an organization module 112 programmed to organize one or more of the users into one or more access-control groups. Although illustrated as separate elements, one or more of modules 102 in FIG. 1 may represent portions of a single module or application. For example, one or more of modules 102 in FIG. 1 may represent portions of an access-control system and/or a role mining system.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be include users 122 for storing information about one or more users, access-control groups 124 for storing information about one or more access-control groups (e.g., preexisting access-control groups 410, access-control group 440, access-control group 460, and/or access-control group 470 in FIG. 4), and user access patterns 126 for storing information about access patterns of one or more users.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6. In at least one example, users 122 and/or access-control groups 124 may represent portions of a directory service (e.g., an active directory service such as a Lightweight Directory Access Protocol directory service).

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204.

In one embodiment, one or more of modules 102 from FIG. 1 may, when executed by at least one processor of server 206, enable server 206 to manage access-control groups. For example, and as will be described in greater detail below, one or more of modules 102 may cause server 206 to (1) track users' access patterns to one or more shared resources (e.g., how users of computing devices 202(1)-(N) access shared resources 210 and 220), (2) analyze the users' access patterns to identify a cluster of users who exhibit similar access patterns to the one or more shared resources, (3) identify a preexisting access-control group (e.g., in access-control groups 124) to which one or more of the users is assigned, (4) compare the preexisting access-control group to the cluster of users, and (5) organize one or more of the users into one or more access-control groups based on the comparison.

Computing devices 202(1)-(N) generally represent any type or form of computing device capable of reading computer-executable instructions. Examples of computing devices 202(1)-(N) include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of storing, managing and/or processing data. Examples of server 206 include, without limitation, application servers, database servers, and shared-resource hosts configured to provide access to certain software applications, database services, and/or any other shared resource. As shown in FIG. 2, server 206 may include shared resources 210 and 220 representing shared resources located on or accessible through server 206. In at least one example, server 206 may represent a portion of an access-control system.

As used herein, the term "shared resource" may generally refer to any resource accessible by a user. For example, a shared resource may include, without limitation, a file system resource (e.g., a file or a folder), a computer (e.g., computing devices 202(1)-(N) and/or server 206), a software application, a hardware device (e.g., a printer, fax machine, hard drive, network interface, etc.), and/or a database resource. In at least one example, access to shared resources may be managed by an access-control system.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing devices 202(1)-(N) and server 206.

Figure 3:
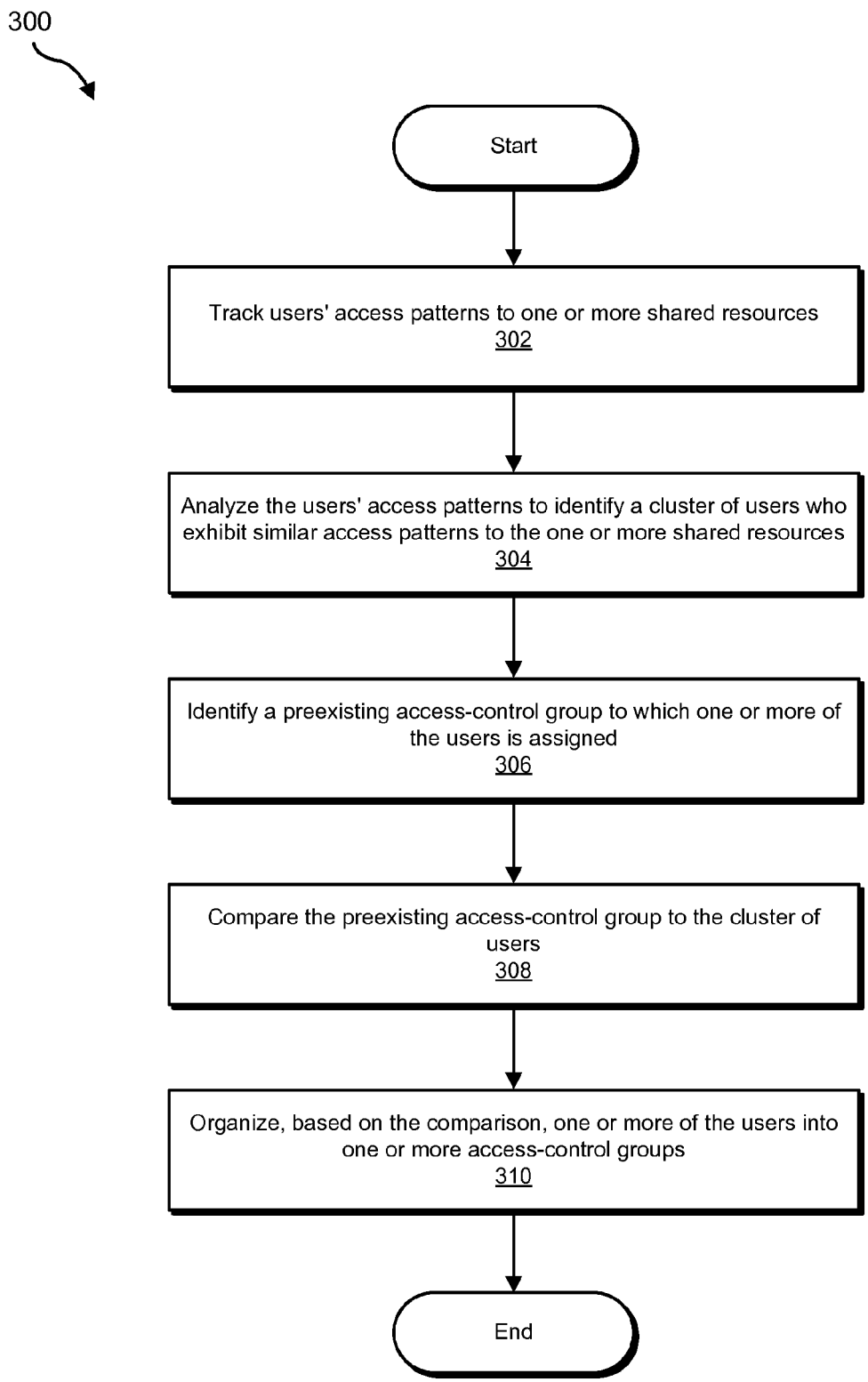
FIG. 3 is a flow diagram of an exemplary method for managing access-control groups.

FIG. 3 is a flow diagram of an exemplary computer-implemented method 300 for managing access-control groups. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

At step 302, one or more of the systems described herein may track users' access patterns to one or more shared resources. For example, at step 302, tracking module 104 may, as part of server 206 in FIG. 2, track the access patterns of users of computing devices 202(1)-(N) as they access shared resources 210 and/or 220.

The term "access pattern," as used herein, may generally refer to information related to a user's access of shared resources. For example, access patterns may include information that indicates the shared resources that the user has accessed, when the user accessed the shared resources, how the user accessed the shared resources (e.g., that a shared resource was read from or written to), the location of the user when the user accessed the shared resources (e.g., the IP address of a computing device used by the user to access a shared resource), and/or any other information related to the user's access of shared resources. As will be explained in greater detail below, users with similar access patterns may be related in some way (e.g., share a job function or role within an organization).

The systems described herein may perform step 302 in a variety of ways. In one example, tracking module 104 may track users' access patterns by monitoring shared resources (e.g., by examining shared resource logs). Additionally or alternatively, tracking module 104 may track users' access patterns by monitoring shared-resource related activities of one or more users (e.g., by monitoring user requests to access shared resources). Tracking module 104 may also record information about user access patterns (e.g., by storing access-pattern information to user access patterns 126).

Figure 4:
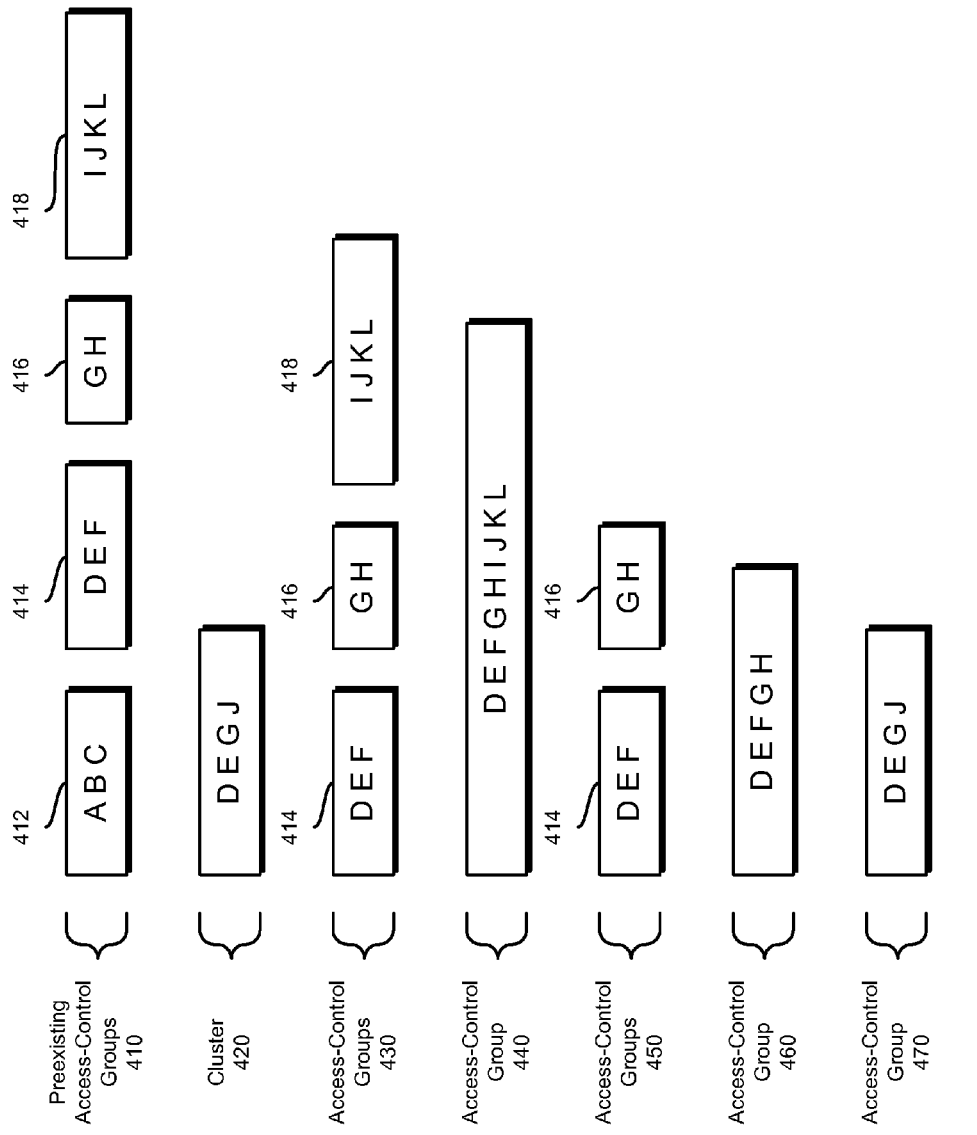
FIG. 4 is a diagram of exemplary access-control groups and an exemplary cluster of users.

In one example, tracking module 104 may monitor users' interactions with shared resources as part of an access-control system. For example, tracking module 104 may identify users managed by the access-control system by identifying access-control groups used by the access-control system to restrict access to shared resources. For example, tracking module 104 may identify preexisting access-control groups 410 as illustrated in FIG. 4 from access-control groups 124. As shown in FIG. 4, preexisting access-control groups 410 may include access-control groups 412, 414, 416, and 418. Each of these access-control groups may be associated with one or more users. For example, as illustrated in FIG. 4, access-control group 412 may include users A, B, and C; access-control group 414 may include users D, E, and F; access-control group 416 may include users G and H; and access-control group 418 may include users I, J, K, and L. In this example, tracking module 104 may track users' access patterns by monitoring shared-resource related activities of users A-L.

As used herein, the term "access-control group" may generally refer to any designation of one or more users that is used by an access-control system to control access to shared resources. Access-control groups may be created by access-control system administrators and/or by the access-control system. For example, to provide a group of users with access to a shared resource, an administrator may create an access-control group representing the group of users and assign permission to access the shared resource to the access-control group. Examples of groups that are often used to create access-control groups include organizational groups (e.g., a legal department, a human resource department, and the like) and/or functional (or role-based) groups (e.g., database administrators, managers, and the like).

Returning to FIG. 3, at step 304, one or more of the systems described herein may analyze the users' access patterns to identify a cluster of users who exhibit similar access patterns to the one or more shared resources. For example, at step 304, analyzing module 106 may, as part of server 206 in FIG. 2, analyze access patterns stored within user access patterns 126 to identify cluster 420 in FIG. 4. In this example, the users within cluster 420 (e.g., users D, E, G, and J) may have similar access patterns to shared resources 210 and/or 220.

As used herein, the term "cluster of users" may generally refer to any set or group of users whose members' behaviors are related in some way. For example, a cluster of users may exhibit similar access patterns to one or more shared resources. In some examples, a cluster of users may include users that access the same or similar files, users who access the same or similar folders, users that access the same or similar shared resources, users who access shared resources from the same Internet Protocol address, and/or users who access shared resources in any other similar manner. A cluster of users that is based on similar access patterns may represent a group of users that are associated with the same role or function within an organization. As will be explained in greater detail below, a cluster of user who exhibit similar access patterns to shared resources may be used to adjust access-control permissions to shared resources and/or create new access-control groups.

Returning to FIG. 3, the systems described herein may perform step 304 in a variety of ways. For example, analyzing module 106 may identify the cluster of users by grouping the users into one or more clusters based on a data-mining analysis of information about users' access patterns. Analyzing module 106 may use any suitable data-mining algorithm or heuristic to perform this analysis (e.g., a clustering algorithm). As mentioned above, by identifying a cluster of users who exhibit similar access patterns to shared resources, analyzing module 106 may identify users that are associated with the same role or function within an organization. This information may, as explained below, be used to create new access-control groups and or adjust permissions associated with preexisting access control groups.

Additionally or alternatively, analyzing module 106 may organize information about users' access patterns into a required form used by a clustering algorithm (e.g., the Clauset-Newman-Moore clustering algorithm). Some clustering algorithms that may be used to identify the cluster of users (e.g., the Clauset-Newman-Moore clustering algorithm) may require data to be structured as a social network graph. For this reason, in one example, analyzing module 106 may represent the users' access patterns using a social network graph. For example, analyzing module 106 may create a social network graph that includes nodes representing users joined by edges representing associations between users.

Examples of associations between users that may be used to connect users within the social network graph include, without limitation, an association between users who accessed a same file, an association between users who accessed a same folder, and/or an association between users who accessed the shared resources from a same Internet Protocol address.

In some examples, prior to analyzing the social network graph to find the cluster of users, analyzing module 106 may remove one or more outliers from the social network graph (perhaps to reduce computational loads and/or to improve clustering algorithm results). For example, analyzing module 106 may remove users (e.g., antivirus applications) who have accessed substantially more or fewer shared resources than other users in the social network graph. In one example, analyzing module 106 may remove any node from the social network graph that is connected by a number of edges above or below a predetermined threshold (e.g., three standard deviations above or below the average number of edges associated with nodes within the social network graph). Additionally or alternatively, analyzing module 106 may remove any node from the social network graph that is associated with a user that has accessed shared resource above or below a predetermined number of times (e.g., three standard deviations above or below the average number times other user have accessed shared resources).

After analyzing module 106 creates the social network graph that represents the users' access patterns, analyzing module 106 may analyze the social network graph using any suitable social-network clustering algorithm to identify the cluster of users.

At step 306, one or more of the systems described herein may identify a preexisting access-control group to which one or more of the users is assigned. For example, at step 306, identification module 108 may, as part of server 206 in FIG. 2, identify one or more of preexisting access-control groups 410 from access-control groups 124 (e.g., access-control groups 430).

The systems described herein may perform step 306 in a variety of ways. In one example, identification module 108 may first identify each user within the cluster of users identified at step 304 and then determine each preexisting access-control group to which each user within the cluster of users has been assigned. For example, identification module 108 may identify access-control groups 430 in FIG. 4 by identifying each user within cluster 420 in FIG. 4 (e.g., user D, E, G, and J) and then identifying each access-control group within preexisting access-control groups 410 to which these users are assigned (in this example, access-control groups 414, 416, and 418).

Because access-control groups are often maintained by directory services, in one example, identification module 108 may identify the preexisting access-control groups by identifying the preexisting access-control group within a directory service. As used herein, the term "directory service" may generally refer to any service used to manage users and/or access-control groups. Examples of directory services include, without limitation, an active directory service such as a Lightweight Directory Access Protocol directory service (e.g., MICROSOFT ACTIVE DIRECTORY®).

At step 308, one or more of the systems described herein may compare the preexisting access-control group to the cluster of users. For example, at step 308, comparison module 110 may, as part of server 206 in FIG. 2, compare access-control groups 430 in FIG. 4 to cluster 420 in FIG. 4.

The systems described herein may perform step 308 in a variety of ways. In one example, comparison module 110 may compare preexisting access-control groups (individually and/or in combination), to the cluster of users in order to determine how similar the preexisting access-control groups are to the cluster of users. Comparison module 110 may attempt to determine how similar the preexisting access-control groups are to the cluster of users in order to determine whether a preexisting access-control group or combination of preexisting access-control groups can be used to represent the cluster of users or whether a new access-control group may be required. By using preexisting access-control groups to represent the cluster of users, the systems and methods described herein may enhance automated roll assignment, enable an administrator to leverage the administrator's knowledge of preexisting access-control groups to understand and interpret new roles or functions represented by the cluster of users and/or help the administrator understand the need to create new access-control groups, adjust permissions associated with preexisting groups and/or adjust membership to preexisting groups.

In one example, comparison module 110 may compare a plurality of preexisting access-control groups to the cluster of users by identifying a subset of the plurality of preexisting access-control groups that reflects the cluster of users and one or more of the plurality of preexisting access-control groups. For example, comparison module 110 may identify which combination of access-control groups 430 in FIG. 4 (perhaps access-control groups 430 or 450 in FIG. 4) best reflects the cluster of users.

In some examples, comparison module 110 may compare a subset of the plurality of preexisting access-control groups to the cluster of users by (1) calculating a score for the subset of the plurality of preexisting access-control groups using a linear combination of features of the subset of the plurality of preexisting access-control groups and (2) determining whether the subset of the plurality of preexisting access-control groups can be used to represent the cluster of users by determining whether the score for the subset of the plurality of preexisting access-control groups is less than a predetermined threshold. As will be explained below, a new access-control group may be needed if the score for the subset of the plurality of preexisting access-control groups is greater than the predetermined threshold.

Comparison module 110 may calculate the score for the subset of the plurality of preexisting access-control groups using a linear combination (perhaps using integer linear programming) of one or more features of the subset of the plurality of preexisting access-control groups. In one example, a lower score may indicate that a combination of preexisting access-control groups better represents the cluster of users.

Examples of features that may be used to calculate the score may include a number of groups within the subset of the plurality of preexisting access-control groups, a number of users within the subset of the plurality of preexisting access-control groups, and/or a percentage of users within the subset of the plurality of preexisting access-control groups whose access patterns have been tracked and/or who are members of the cluster of users. Using cluster 420 and access-control groups 430 in FIG. 4 as an example, access-control groups 430 includes three groups and nine users. In addition, 100% of the users within access-control groups 430 have had their access patterns tracked and approximately 44% of the users are included in cluster 420.

The coefficients used in the linear combination may allow an administrator to indicate how a subset of the plurality of preexisting access-control groups best represents a cluster of users. For example, the coefficients used in the linear combination may be used as weights to encourage or discourage certain features from being included in the subsets of the plurality of preexisting access-control groups that comparison module 110 determines may be used to represent the cluster of users.

In one example, if the administrator wants to represent the cluster with smaller subset of the plurality of preexisting access-control groups, the administrator may assign a larger value to the coefficient corresponding to the number of groups within the subset of the plurality of preexisting access-control groups. For example, access-control groups 430 in FIG. 4 would receive a higher score than access-control groups 450 in FIG. 4 based on the number of groups in each subset (in this example, 3 and 2, respectively).

Similarly, if the administrator wants to represent the cluster of users using a more restrictive subset of the plurality of preexisting access-control groups (e.g., a combination of preexisting access-control group that includes few users not within the cluster of users), the administrator may assign a smaller value to the coefficient corresponding to the percentage of users within the subset of the plurality of preexisting access-control groups who are members of the cluster of users. For example, access-control groups 430 in FIG. 4 would receive a higher score than access-control groups 450 in FIG. 4 based on the percentage of users within the subset of the plurality of preexisting access-control groups who are members of the cluster of users (in this example, 44% and 60%, respectively).

Because a subset of preexisting access-control groups containing many groups may be more difficult to understand, in at least one example, the number of groups included in a subset of the plurality of preexisting access-control groups may be limited to a predetermined maximum value.

At step 310, one or more of the systems described herein may organize, based on the comparison, one or more of the users into one or more access-control groups. For example, at step 310, organization module 112 may, as part of server 206 in FIG. 2, organize, based on the comparison made in step 308, one or more of the users in cluster 420 in FIG. 4 into one or more of the access-control groups illustrated in FIG. 4.

The systems described herein may perform step 310 in a variety of ways. In some examples, organization module 112 module may organize one or more of the users into one or more new access-control groups, adjust permissions associated with one or more preexisting access-control groups, and/or adjust membership assignment of one or more preexisting access-control groups.

In one example, organization module 112 module may organize one or more of the users into one or more access-control groups by (1) creating, based on the subset of preexisting access control groups and/or the cluster of users identified in step 308, a new access control group and (2) organizing, based on the determination that the score for the subset of the plurality of preexisting access-control groups is greater than the predetermined threshold (as calculated in step 308), at least one user from the cluster of users into the new access-control group. For example, organization module 112 may determine that based on the determination that the score for the subset of the plurality of preexisting access-control groups is greater than the predetermined threshold that the subset of the plurality of preexisting access-control groups does not best represent the cluster of users and that a new access-control groups would better represent the cluster of users. For example, organization module 112 may, based on the comparison of cluster 420 and access-control groups 430, create and organize one or more of users A-L into one or more of access-control groups 440, 460, and/or 470. In this example, access-control group 440 reflects preexisting access-control groups 430; access-control group 460 reflects preexisting access-control groups 450; and access-control group 470 reflects cluster 420.

In another example, organization module 112 may organize one or more of the users into one or more access-control groups by (1) organizing one or more of the users into one or more preexisting access-control groups and/or (2) adjusting access-control permissions associated with the one or more preexisting access-control groups. For example, organization module 112 may adjust permissions associated with and/or adjust membership assignments of one or more of preexisting access-control groups 412, 414, 416, and 418.

In at least one example, organization module 112 may automatically organize one or more of the users into one or more access-control groups. Additionally or alternatively, organization module 112 may organize one or more of the users into one or more access-control groups by suggesting to an administrator one or more preexisting access-control groups and/or one or more new access-control groups by which the administrator may organize one or more of the users In certain embodiments, organization module 112 may also enable the administrator to name and/or otherwise identify a new access-control group. Upon completion of step 310, exemplary method 300 in FIG. 3 may terminate.

As explained above, by organizing users into access-control groups based on shared-resource access patterns and preexisting access-control group organizational efforts, the systems and methods described herein may enable an administrator to manage access-control groups in an understandable and meaningful way. Furthermore, in some examples, by analyzing shared-resource access patterns and preexisting access-control group organizational efforts, these systems and methods may assist the administrator in identifying new access-control groups or combinations of preexisting access-control groups that reflect new roles or functions not yet represented by preexisting access-control groups.

Figure 5:
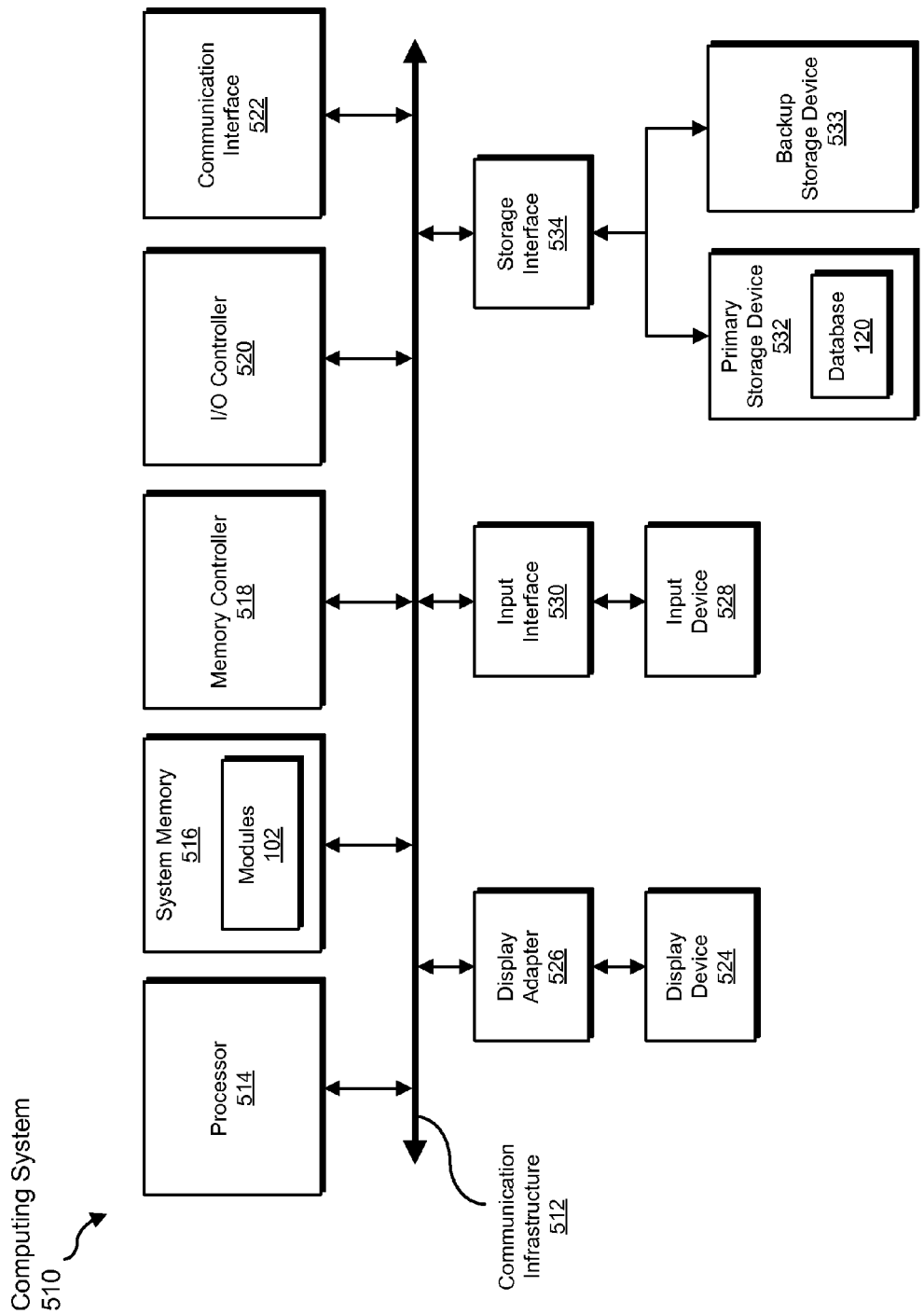
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the managing, tracking, analyzing, identifying, comparing, organizing, calculating, determining, creating, adjusting, and representing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
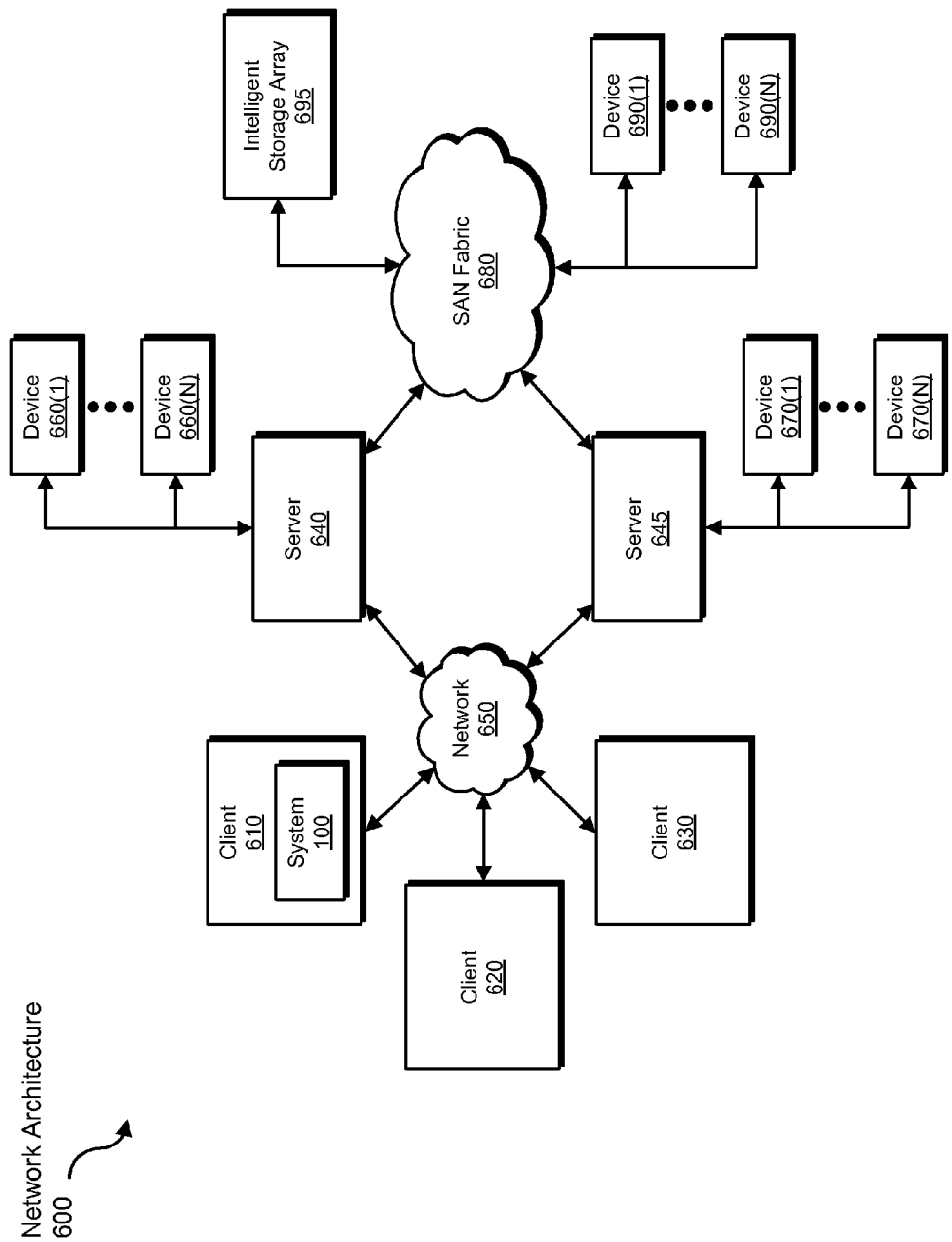
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the managing, tracking, analyzing, identifying, comparing, organizing, calculating, determining, creating, adjusting, and representing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for managing access-control groups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system capable of managing access-control groups.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing access-control groups, at least a portion of the method being performed by a computing device comprising at least one processor, the method comprising:

tracking users' access activities related to one or more shared resources;

analyzing the users' access activities to identify a cluster of users who exhibit similar access activities related to the one or more shared resources;

identifying a plurality of preexisting access-control groups to which one or more of the users is assigned;

identifying one or more of the plurality of preexisting access-control groups that best represent the cluster of users;

using the one or more of the plurality of preexisting access-control groups that best represent the cluster of users to organize one or more of the users into one or more access-control groups by:

calculating a score for the one or more of the plurality of preexisting access-control groups;

organizing at least one user from the cluster of users into a new access-control group if the score for the one or more of the plurality of preexisting access-control groups is greater than a predetermined threshold;

organizing one or more of the users into the one or more of the plurality of preexisting access-control groups if the score for the one or more of the plurality of preexisting access-control groups is less than the predetermined threshold, wherein the step of analyzing the users' access activities is performed by the computing device.

2. The method of claim 1, wherein:
the score is lower than the predetermined threshold;
the score indicates that a combination of the plurality of preexisting access-control groups better represents the cluster of users than other access-control groups.

3. The method of claim 1, wherein
the score for the one or more of the plurality of preexisting access-control groups is calculated using a linear combination of at least one of:
a number of groups within the one or more of the plurality of preexisting access-control groups;
a number of users within the one or more of the plurality of preexisting access-control groups;
a percentage of users within the one or more of the plurality of preexisting access-control groups whose access activities have been tracked.

4. The method of claim 1, wherein:
the score for the one or more of the plurality of preexisting access-control groups is calculated using a linear combination of at least one of:
a number of groups within the one or more of the plurality of preexisting access-control groups;
a number of users within the one or more of the plurality of preexisting access-control groups;
a percentage of users within the one or more of the plurality of preexisting access-control groups whose access activities have been tracked;
the new access-control group is created based on the one or more of the preexisting access-control groups and the cluster of users.

5. The method of claim 1, wherein organizing the one or more of the users into the one or more of the plurality of preexisting access-control groups comprises adjusting access-control permissions associated with the one or more of the plurality of preexisting access-control groups.

6. The method of claim 1, wherein identifying the plurality of preexisting access-control groups to which one or more of the users is assigned comprises identifying the plurality of preexisting access-control groups within a directory service.

7. The method of claim 1, wherein tracking the users' access activities comprises at least one of:
tracking a pattern by which the users have accessed the one or more shared resources;
tracking a pattern by which the users have attempted to access the one or more shared resources.

8. The method of claim 1, wherein analyzing the users' access activities to identify the cluster of users who exhibit similar access activities related to the one or more shared resources comprises:
representing the users and the users' access activities as a social-network graph, wherein the social-network graph comprises:
nodes that represent the users; and
edges connecting the nodes, the edges representing at least one of:
an association between users who accessed a same file;
an association between users who accessed a same folder;
an association between users who accessed the one or more shared resources from a same Internet Protocol address;
analyzing the social-network graph to identify the cluster of users.

9. A system for managing access-control groups, the system comprising:
a tracking module programmed to track users' access activities related to one or more shared resources;
an analyzing module programmed to analyze the users' access activities to identify a cluster of users who exhibit similar access activities related to the one or more shared resources;
an identification module programmed to identify a plurality of preexisting access-control groups to which one or more of the users is assigned;
a comparison module programmed to identify one or more of the plurality of preexisting access-control groups that best represent the cluster of users; an organization module programmed to use the one or more of the plurality of preexisting access-control groups that best represent the cluster of users to organize one or more of the users into one or more access-control groups by:
calculating a score for the one or more of the plurality of preexisting access-control groups;
organizing at least one user from the cluster of users into a new access-control group if the score for the one or more of the plurality of preexisting access-control groups is greater than a predetermined threshold;
organizing one or more of the users into the one or more of the plurality of preexisting access-control groups if the score for the one or more of the plurality of preexisting access-control groups is less than the predetermined threshold;
at least one hardware processor configured to execute the tracking module, the analyzing module, the identification module, the comparison module, and the organization module.

10. The system of claim 9, wherein:
the score is lower than the predetermined threshold;
the score indicates that a combination of the plurality of preexisting access-control groups better represents the cluster of users than other access-control groups.

11. The system of claim 9, wherein the comparison module is programmed to
calculate the score for the one or more of the plurality of preexisting access-control groups using a linear combination of at least one of:
a number of groups within the one or more of the plurality of preexisting access-control groups;
a number of users within the one or more of the plurality of preexisting access-control groups;
a percentage of users within the one or more of the plurality of preexisting access-control groups whose access activities have been tracked.

12. The system of claim 9, wherein:
the comparison module is programmed to calculate
the score for the one or more of the plurality of preexisting access-control groups using a linear combination of at least one of:
a number of groups within the one or more of the plurality of preexisting access-control groups;
a number of users within the one or more of the plurality of preexisting access-control groups;
a percentage of users within the one or more of the plurality of preexisting access-control groups whose access activities have been tracked;
the organization module is programmed to
create the new access-control group based on the one or more of the preexisting access-control groups and the cluster of users.

13. The system of claim 9, wherein the organization module is programmed to organize the one or more of the users into the one or more of the plurality of preexisting access-control groups by adjusting access-control permissions associated with the one or more of the plurality of preexisting access-control groups.

14. The system of claim 9, wherein the tracking module is programmed to track the users' access activities by performing at least one of:

tracking a pattern by which the users have accessed the one or more shared resources;

tracking a pattern by which the users have attempted to access the one or more shared resources.

15. The system of claim 9, wherein the analyzing module is programmed to analyze the users' access activities to identify the cluster of users who exhibit similar access activities related to the one or more shared resources by:

representing the users and the users' access activities as a social-network graph, wherein the social-network graph comprises:

nodes that represent the users; and edges connecting the nodes, the edges representing at least one of:

an association between users who accessed a same file;

an association between users who accessed a same folder;

an association between users who accessed the one or more shared resources from a same Internet Protocol address;

analyzing the social-network graph to identify the cluster of users.

16. A non-transitory computer-readable-storage medium comprising one or more computer-executable instructions that, when executed by at least one processor of a computing device, cause the computing device to:

track users' access activities related to one or more shared resources;

analyze the users' access activities to identify a cluster of users who exhibit similar access activities related to the one or more shared resources;

identify a plurality of preexisting access-control groups to which one or more of the users is assigned;

identify one or more of the plurality of preexisting access-control groups that best represent the cluster of users;

use the one or more of the plurality of preexisting access-control groups that best represent the cluster of users to organize one or more of the users into one or more access-control groups by:

calculating a score for the one or more of the plurality of preexisting access-control groups;

organizing at least one user from the cluster of users into a new access-control group if the score for the one or more of the plurality of preexisting access-control groups is greater than a predetermined threshold;

organizing one or more of the users into the one or more of the plurality of preexisting access-control groups if the score for the one or more of the plurality of preexisting access-control groups is less than the predetermined threshold.

17. The non-transitory computer-readable-storage medium of claim 16, wherein:

the score is lower than the predetermined threshold;

the score indicates that a combination of the plurality of preexisting access-control groups better represents the cluster of users than other access-control groups.

18. The non-transitory computer-readable-storage medium of claim 16, wherein the one or more computer-executable instructions are programmed to cause the computing device to calculate the score for the one or more of the plurality of preexisting access-control groups using a linear combination of at least one of:

a number of groups within the one or more of the plurality of preexisting access-control groups;

a number of users within the one or more of the plurality of preexisting access-control groups;

a percentage of users within the one or more of the plurality of preexisting access-control groups whose access activities have been tracked.

19. The non-transitory computer-readable-storage medium of claim 16, wherein the one or more computer-executable instructions are programmed to cause the computing device to:

calculate the score for the one or more of the plurality of preexisting access-control groups using a linear combination of at least one of:

a number of groups within the one or more of the plurality of preexisting access-control groups;

a number of users within the one or more of the plurality of preexisting access-control groups;

a percentage of users within the one or more of the plurality of preexisting access-control groups whose access activities have been tracked;

create the new access-control group based on the one or more of the preexisting access-control groups and the cluster of users.

20. The non-transitory computer-readable-storage medium of claim 16, wherein the one or more computer-executable instructions are programmed to cause the computing device to organize the one or more of the users into the one or more of the plurality of preexisting access-control groups by adjusting access-control permissions associated with the one or more of the plurality of preexisting access-control groups.

* * * * *

UNITED STATES PATENT AND TRADEMARK OFFICE
CERTIFICATE OF CORRECTION

PATENT NO. : 9,077,728 B1  
APPLICATION NO. : 13/420840  
DATED : July 7, 2015  
INVENTOR(S) : Michael Hart and Yin Liu Page 1 of 2

It is certified that error appears in the above-identified patent and that said Letters Patent is hereby corrected as shown below:

In the Claims

Claim 3, at column 17, lines 9 to 12, should read:
The method of claim 1, wherein the score for the one or more of the plurality of preexisting access-control groups is calculated using a linear combination of at least one of:

Claim 9, at column 18, lines 12 to 18, should read:
a comparison module programmed to identify one or more of the plurality of preexisting access-control groups that best represent the cluster of users;
an organization module programmed to use the one or more of the plurality of preexisting access-control groups that best represent the cluster of users to organize one or more of the users into one or more access-control groups by:

Claim 11, at column 18, lines 39 to 43, should read:
The system of claim 9, wherein the comparison module is programmed to calculate the score for the one or more of the plurality of preexisting access-control groups using a linear combination of at least one of:

Claim 12, at column 18, lines 51 to 55, should read:
The system of claim 9, wherein:
the comparison module is programmed to calculate the score for the one or more of the plurality of preexisting access-control groups using a linear combination of at least one of:

Claim 12, at column 18, lines 63 to 66, should read:
the organization module is programmed to create the new access-control group based on the one or more of the preexisting access-control groups and the cluster of users.

Signed and Sealed this
Ninth Day of February, 2016

Michelle K. Lee
*Director of the United States Patent and Trademark Office*

Claim 13, at column 19, lines 1 to 7, should read:
The system of claim 9, wherein the organization module is programmed to organize the one or more of the users into the one or more of the plurality of preexisting access-control groups by adjusting access-control permissions associated with the one or more of the plurality of preexisting access-control groups.

Claim 18, at column 20, lines 14 to 20, should read:
The non-transitory computer-readable-storage medium of claim 16, wherein the one or more computer-executable instructions are programmed to cause the computing device to calculate the score for the one or more of the plurality of preexisting access-control groups using a linear combination of at least one of: